United States Patent
Oki et al.

(10) Patent No.: US 7,303,616 B2
(45) Date of Patent: *Dec. 4, 2007

(54) INK COMPOSITION, INK JET RECORDING METHOD AND RECORDED ARTICLE

(75) Inventors: Yasuhiro Oki, Nagano-ken (JP); Kazuhiko Kitamura, Nagano-ken (JP); Hiroko Hayashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/533,731

(22) PCT Filed: Sep. 28, 2004

(86) PCT No.: PCT/JP2004/014189

§ 371 (c)(1),
(2), (4) Date: Oct. 27, 2005

(87) PCT Pub. No.: WO2005/030885

PCT Pub. Date: Apr. 7, 2005

(65) Prior Publication Data

US 2006/0135646 A1    Jun. 22, 2006

(30) Foreign Application Priority Data

Sep. 30, 2003  (JP) .............................. 2003-341633

(51) Int. Cl.
C09D 11/00 (2006.01)
C09D 11/02 (2006.01)
B41J 2/01 (2006.01)
(52) U.S. Cl. ................. 106/31.49; 106/31.58; 106/31.59; 347/100
(58) Field of Classification Search ............. 106/31.49, 106/31.58, 31.59; 347/100
See application file for complete search history.

(56) References Cited

U.S. PATENT DOCUMENTS

| | | | | |
|---|---|---|---|---|
| 4,163,675 A | * | 8/1979 | Hirano et al. ............ | 106/31.43 |
| 5,478,383 A | * | 12/1995 | Nagashima et al. ...... | 106/31.43 |
| 6,319,309 B1 | * | 11/2001 | Lavery et al. ........... | 106/31.27 |
| 6,379,441 B1 | * | 4/2002 | Kanaya et al. ........... | 106/31.49 |
| 7,083,669 B2 | * | 8/2006 | Fukumoto et al. ....... | 106/31.49 |
| 2005/0183630 A1 | * | 8/2005 | Oki et al. ................ | 106/31.49 |
| 2006/0135646 A1 | * | 6/2006 | Oki et al. ................... | 523/160 |
| 2006/0203059 A1 | * | 9/2006 | Oki et al. .................. | 347/100 |
| 2006/0233976 A1 | * | 10/2006 | Uhlir-Tsang et al. .... | 428/32.34 |

FOREIGN PATENT DOCUMENTS

| | | |
|---|---|---|
| AU | 54842 | 10/1974 |
| EP | 1 088 864 | 4/2001 |
| EP | 1088864 | * 4/2001 |
| JP | 03-054268 | 3/1991 |
| JP | 2002-332434 | 11/2002 |
| JP | 2002-362004 | 12/2002 |
| WO | 99/50363 | 7/1999 |

OTHER PUBLICATIONS

Patent Abstracts of Japan of JP 2002-362004 dated Dec. 18, 2002 and English Computer-Generated Translation of Claims and Specification.
Patent Abstracts of Japan of JP 2002-332434 dated Nov. 22, 2002 and English Computer Generated Translation of Claims and Specification.
Patent Abstracts of Japan of JP 03-054268 dated Mar. 8, 1991.
English Abstract of WO 99/50363 dated Jul. 10, 1999.

* cited by examiner

Primary Examiner—Helene Klemanski
(74) Attorney, Agent, or Firm—Ladas & Parry LLP

(57) ABSTRACT

It is an object of the present invention to provide an ink composition using a metal phthalocyanine type cyan dye, according to which the indoor storability (gas resistance) of images created using the ink composition can be improved. The present invention provides an ink composition containing water, metal phthalocyanine type cyan dye, and aromatic compound having a sulfo group and/or salt thereof represented by undermentioned general formula (1) and/or (2). Moreover, the present invention provides an ink jet recording method comprising carrying out recording by discharging droplets of an ink composition and attaching the droplets to a recording medium, wherein the ink jet recording method uses an ink composition as described above as the ink composition. Furthermore, the present invention provides a recorded article characterized by being obtained by recording using an ink composition as described above.

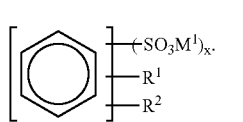

(1)

(In the formula, $M^1$ represents a counter ion forming a salt, X represents an integer from 1 to 3, and $R^1$ and $R^2$ each represents a hydrogen atom, an alkyl group having 1 to 6 carbon atoms or an alkoxy group having 1 to 6 carbon atoms, and $R^1$ and $R^2$ may be the same or different.)

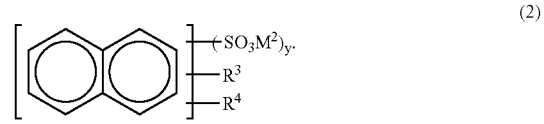

(2)

(In the formula, $M^2$ represents a counter ion forming a salt, Y represents an integer from 1 to 4, and $R^3$ and $R^4$ each represents a hydrogen atom, an alkyl group having 1 to 6 carbon atoms or an alkoxy group having 1 to 6 carbon atoms, and $R^3$ and $R^4$ may be the same or different.)

21 Claims, 2 Drawing Sheets

INK COMPOSITION, INK JET RECORDING METHOD AND RECORDED ARTICLE

CROSS-REFERENCES

The present invention relates to an ink composition according to which the indoor storability (gas resistance) of created images can be improved, and more specifically to a metal phthalocyanine type cyan dye-containing ink composition according to which discoloration/fading of images can be prevented effectively.

BACKGROUND

From hitherto, ink compositions using metal phthalocyanine type cyan dyes have been widely used as ink compositions for coloring images with an excellent cyan color or the like. Moreover, in recent times it has become common to form images using such an ink composition and one or a plurality of other ink compositions for producing other colors, and to display images comprising a plurality of colors (color images) thus obtained indoors and so on.

However, with such an ink composition using a metal phthalocyanine type cyan dye, the metal phthalocyanine type cyan dye has poor resistance to oxidizing gases such as ozone, nitrogen oxides and sulfur oxides present in the air, in particular ozone resistance, and hence there has been a problem that upon forming a multi-colored image together with ink compositions of other colors and displaying the image indoors, discoloration/fading of the image formed from the cyan dye occurs rapidly.

Various ink compositions have been developed to prevent such metal phthalocyanine discoloration/fading. For example, a cyan ink composition containing a copper phthalocyanine type cyan dye, an imidazole derivative, and any of an antioxidant, a saccharide, and a naphthalene-1-sulfonic acid having a hydroxyl group or an amino group in the 4 position has been disclosed in WO 99/50363 as means for improving light-fastness.(Application No. WO99/50363) However, with this ink composition, ozone gas resistance has not been evaluated, and moreover there is a problem that there is a hydroxyl group or amino group in the molecule of a component used, and this causes a phenomenon in which images turn green or black due to nitrogen oxides ($NO_x$) gases).

SUMMARY

It is thus an object of the present invention to provide an ink composition using a metal phthalocyanine type cyan dye, according to which the indoor storability (gas resistance) of images created using the ink composition can be improved.

The present inventors carried out assiduous studies, and as a result found that an ink composition containing a specific component in addition to the metal phthalocyanine type cyan dye is able to attain the above object.

The present invention has been accomplished based on this finding, and provides [1] an ink composition, characterized by containing water, metal phthalocyanine type cyan dye, and aromatic compound having a sulfo group and/or salt thereof represented by undermentioned general formula (1) and/or (2).

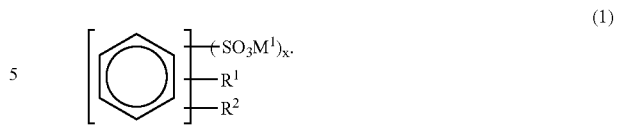

(In the formula, $M^1$ represents a counter ion forming a salt, X represents an integer from 1 to 3, and $R^1$ and $R^2$ each represents a hydrogen atom, an alkyl group having 1 to 6 carbon atoms or an alkoxy group having 1 to 6 carbon atoms, and $R^1$ and $R^2$ may be the same or different.)

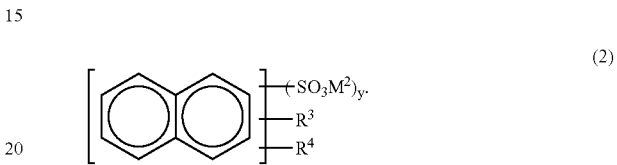

(In the formula, $M^2$ represents a counter ion forming a salt, Y represents an integer from 1 to 4, and $R^3$ and $R^4$ each represents a hydrogen atom, an alkyl group having 1 to 6 carbon atoms or an alkoxy group having 1 to 6 carbon atoms, and $R^3$ and $R^4$ may be the same or different.).

Moreover, the present invention provides: [2] the ink composition according to [1], wherein the metal phthalocyanine type cyan dye is copper phthalocyanine type dye represented by undermentioned formula (3)

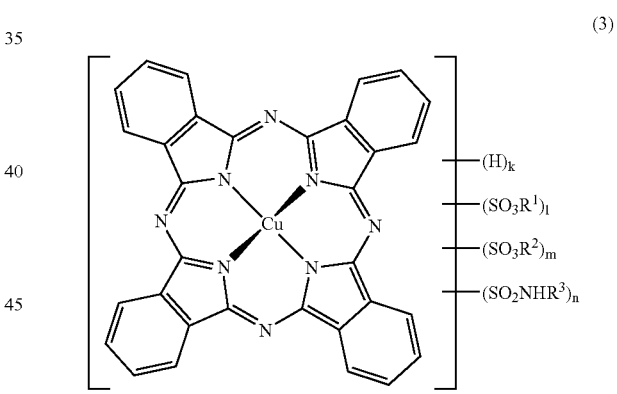

(In the formula, $R^1$ represents H, an alkali metal or $-NH_4$, $R^2$ represents an alkali metal or $-NH_4$, and $R^3$ represents H, an optionally substituted alkyl group or an optionally substituted aryl group; moreover, k, l and n each represents a natural number from 0 to 3, and m represents a natural number from 1 to 4, and k+l+m+n=4.); [3] The ink composition according to [2], wherein the copper phthalocyanine type dye is C.I. Direct Blue 86, 87 and/or 199; [4] The ink composition according to any of [1] through [3], wherein the metal phthalocyanine type cyan dye is a dye for which the absorption spectrum in the visible region (400 to 800 nm) has a maximum absorption peak at a wavelength in a range of 590 to 650 nm; [5] The ink composition according to any of [1] through [4], wherein the metal phthalocyanine type cyan dye is a dye for which the absorption spectrum in the visible region (400 to 800 nm) has a maximum absorption peak at a wavelength in a range of 590 to 615 nm; [6] The ink composition according to any of [1] through [5], wherein the metal phthalocyanine type cyan dye is a dye for which the absorption spectrum in the visible region (400 to 800 nm) has a maximum absorption peak at a wavelength in a range of 590 to 605 nm; [7] The ink composition according to any of [1] through [6], wherein the aromatic compound having a sulfo group and/or salt thereof has at least two sulfo groups; [8] The ink composition according to [7], wherein the aromatic compound having a sulfo group and/or salt thereof is at least one selected from the group consisting of benzene-1,3-disulfonic acid, naphthalene-1,5-disulfonic acid, naphthalene-1,6-disulfonic acid, naphthalene-2,6-disulfonic acid, naphthalene-2,7-disulfonic acid, and naphthalene-1,3,6-trisulfonic acid, and salts thereof; [9] The ink composition according to any of [1] through [8], wherein the salt of the aromatic compound having a sulfo group is an alkali metal salt; [10] The ink composition according to any of [1] through [9], containing 0.1 to 10 wt % of the aromatic compound having a sulfo group and/or salt thereof relative to the total amount of the ink composition; [11] The ink composition according to any of [1] through [10], wherein the content ratio between the metal phthalocyanine type cyan dye and the aromatic compound having a sulfo group and/or salt thereof is in a range of 1:0.1 to 1:10; [12] The ink composition according to any of [1] through [11], further containing a nonionic surfactant; [13] The ink composition according to [12], wherein the nonionic surfactant is an acetylene glycol type surfactant; [14] The ink composition according to [12] or [13], containing 0.1 to 5 wt % of the nonionic surfactant relative to the total amount of the ink composition; [15] The ink composition according to any of [1] through [14], further containing a penetrating agent; [16] The ink composition according to [15], wherein the penetrating agent is a glycol ether; [17] The ink composition according to any of [1] through [16], wherein the ink composition has a pH at 20° C. in a range of 8.0 to 10.5; [18] The ink composition according to any of [1] through [17], used in an ink jet recording method; [19] The ink composition according to [18], wherein the ink jet recording method is a recording method using an ink jet head that forms ink droplets through mechanical deformation of electrostrictive elements; [20] An ink cartridge, characterized by comprising the ink composition according to any of [1] through [19]; [21] An ink jet recording method, comprising carrying out recording by discharging droplets of an ink composition and attaching the droplets to a recording medium, the ink jet recording method characterized by using the ink composition according to any of [1] through [19] as the ink composition; [22] A recorded article, characterized by being obtained by recording using the ink composition according to any of [1] through [19].

DETAILED DESCRIPTION

Figure 1:
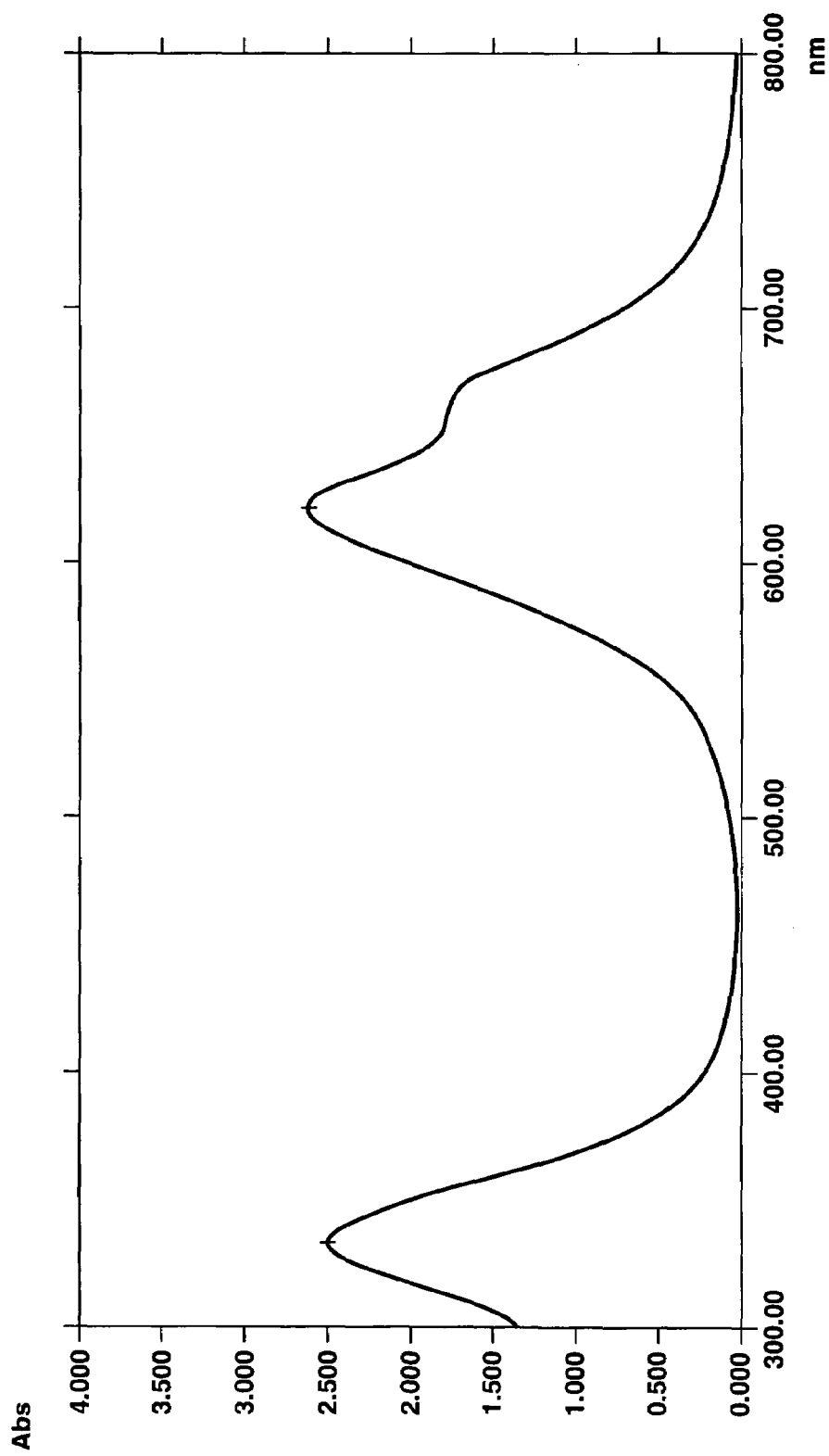
FIG. 1 is a graph showing the spectral characteristics (absorption wavelengths) of a dye (C.I. Direct Blue 86) (*4) contained in an ink composition of a first preferable form according to the present invention.

Following is a detailed description of an ink composition of the present invention based on preferable embodiments thereof.

As stated earlier, the ink composition of the present invention is characterized by containing water, metal phthalocyanine type cyan dye, and aromatic compound having a sulfo group and/or salt thereof represented by previously mentioned general formula (1) and/or (2).

Because the ink composition of the present invention has such a constitution, rapid fading of cyan images can be prevented effectively, and hence the indoor storability (gas resistance) of created images can be improved.

The ink composition of the present invention contains metal phthalocyanine type cyan dye, and aromatic compound having a sulfo group and/or salt thereof represented by previously mentioned general formula (1) and/or (2), in water or an aqueous medium comprising water and water-soluble organic solvents, and as necessary may also contain humectants, viscosity regulators, pH regulators and other additives.

There are no particular limitations on the cyan dye used in the ink composition of the present invention so long as this cyan dye is a metal phthalocyanine type cyan dye, but better improvement effects can be obtained with a copper phthalocyanine type dye in particular.

An example of a copper phthalocyanine type dye is a dye represented by previously mentioned formula (3).

Specifically, from the standpoint of obtaining marked improvement effects, examples include C.I. Direct Blues 86, 87 and 199.

These dyes may be used alone or in combination with one another, and moreover may be used in combination with other dyes.

Moreover, as a metal phthalocyanine type cyan dye, it is preferable to use a dye for which the absorption spectrum in the visible region (400 to 800 nm) has a maximum absorption peak at a wavelength in a range of 590 to 650 nm, particularly preferably 590 to 615 nm, especially preferably 590 to 605 nm, from the standpoint of improving the ozone resistance ability.

The content of the metal phthalocyanine type cyan dye is set as appropriate in accordance with the type of the dye, the type of solvent components and so on, but is preferably in a range of 0.1 to 10 wt %, more preferably 0.5 to 5 wt %, relative to the total weight of the ink composition. By making this content be at least 0.1 wt %, good colorability and image density on a recording medium can be secured, and by making this content be not more than 10 wt %, regulating the viscosity of the ink composition becomes easy and hence good properties such as discharge stability and clogging resistance can be easily secured.

The ink composition of the present invention contains aromatic compound having a sulfo group and/or salt thereof represented by previously mentioned general formula (1) and/or (2), this being to lessen or eliminate discoloration/fading seen in the case of carrying out solid printing using an ink composition containing a metal phthalocyanine type cyan dye as above (a phenomenon thought to be caused by the metal phthalocyanine type cyan dye having poor gas resistance, in particular ozone resistance).

With the present invention, by using such aromatic compound having a sulfo group and/or salt thereof represented by general formula (1) and/or (2) in combination with the metal phthalocyanine type cyan dye, discoloration/fading of images due to ozone gas can be suppressed, and hence the fading resistance of images can be improved dramatically, without bringing about a phenomenon of turning green or black due to $NO_x$ gases.

Moreover, with the present invention, so long as the ink composition contains water, metal phthalocyanine type cyan dye as above, and aromatic compound having a sulfo group or salt thereof as above, discoloration/fading seen in the case of carrying out solid printing can be effectively prevented not only for a cyan ink composition, but even for an ink composition of a color other than cyan, for example a black ink composition. To manufacture such ink compositions of various types, the metal phthalocyanine type cyan dye can be used together with other dyes publicly known from hitherto.

As the aromatic compound having a sulfo group and/or salt thereof represented by general formula (1) and/or (2), any aromatic compound having sulfo group in the molecular structure thereof or salt thereof is acceptable, although at least one compound having at least two sulfo groups, particularly at least one compound selected from the group consisting of benzene-1,3-disulfonic acid, naphthalene-1,5-disulfonic acid, naphthalene-1,6-disulfonic acid, naphthalene-2,6-disulfonic acid, naphthalene-2,7-disulfonic acid, and naphthalene-1,3,6-trisulfonic acid, and salts thereof is preferable from the standpoint of improving the ozone resistance of obtained images.

A salt of an aromatic compound having a sulfo group as above may be put into the ink composition by being added in the form of the salt, or may be put into the ink composition by adding the aromatic compound having a sulfo group and a base separately. In such a salt, there are no particular limitations on the counter ion forming the salt, with examples including metal salts and ammonium salts; an alkali metal salt is particularly preferable, specifically a sodium salt, a lithium salt, a potassium salt or the like.

The content of the aromatic compound having a sulfo group and/or salt thereof is set as appropriate in accordance with the type of the aromatic compound having a sulfo group and/or salt thereof, the type of the dye, the type of solvent components and so on, but is preferably in a range of 0.1 to 10 wt %, more preferably 0.5 to 10 wt %, relative to the total weight of the ink composition.

With the ink composition of the present invention, from the standpoint of securing the reliability of the ink and improving the gas resistance effectively, the content ratio between the metal phthalocyanine type cyan dye and the aromatic compound having a sulfo group and/or salt thereof is preferably in a range of 1:0.1 to 1:10, particularly preferably 1:0.2 to 1:5.

To stably dissolve the amounts of the prescribed dye and aromatic compound having a sulfo group and/or salt thereof, the pH of the ink composition (at 20° C.) is preferably at least 8.0. Moreover, considering the material resistance for the various members that will come into contact with the ink composition, the pH of the ink composition is preferably not more than 10.5. To satisfy both of these things yet better, the pH of the ink composition is more preferably adjusted to be within a range of 8.0 to 10.5, particularly preferably 8.5 to 10.0.

The ink composition of the present invention may further contain at least one humectant selected from saccharides and/or water-soluble organic solvents having a lower vapor pressure than pure water.

By including a humectant, with an ink jet recording method, evaporation of water can be suppressed and hence the ink can be prevented from drying up. Moreover, in the case of a water-soluble organic solvent, the discharge stability can be improved, and the viscosity can easily be changed without changing the ink properties.

'Water-soluble organic solvents' refers to media having the ability to dissolve a solute, and are selected from solvents that are organic, are water-soluble, and have a lower vapor pressure than water. Specifically, polyhydric alcohols such as ethylene glycol, propylene glycol, butanediol, pentanediol, 2-butene-1,4-diol, 2-methyl-2,4-pentanediol, glycerol, 1,2,6-hexanetriol, diethylene glycol, triethylene glycol and dipropylene glycol, ketones such as acetonyl acetone, esters such as γ-butyrolactone and triethyl phosphate, furfuryl alcohol, tetrahydrofurfuryl alcohol, thiodiglycol, and so on are preferable.

Moreover, as saccharides, maltitol, sorbitol, gluconolactone, maltose, and so on are preferable.

Such humectants are preferably added in a range of 5 to 50 wt %, more preferably 5 to 30 wt %, yet more preferably 5 to 20 wt %, relative to the total amount of the ink composition. If the amount added is at least 5 wt %, then humectation is obtained, and if the amount added is not more than 50 wt %, then adjustment to a viscosity enabling use in ink jet recording can be carried out easily.

Moreover, the ink composition of the present invention preferably contains a nitrogen-containing organic solvent as a solvent. Examples of such nitrogen-containing organic solvents include 1,3-dimethyl-2-imidazolidinone, 2-pyrrolidone, N-methyl-2-pyrrolidone, and ε-caprolactam, and of these 2-pyrrolidone is preferably used. Such nitrogen-containing organic solvents may be used alone, or a plurality may be used together.

The content thereof is preferably 0.5 to 10 wt %, more preferably 1 to 5 wt %. By making this content be at least 0.5 wt %, an improvement in the solubility of the colorant in the present invention can be achieved through the addition, and by making this content be not more than 10 wt %, there will be no worsening of the material resistance for the various members that will come into contact with the ink composition.

Moreover, the ink composition of the present invention preferably contains a nonionic surfactant, this being as an additive effective for obtaining rapid fixing (penetration) of the ink, and also for maintaining the circularity of the individual dots.

Examples of nonionic surfactants that can be used in the present invention include acetylene glycol type surfactants. Specific examples of acetylene glycol type surfactants include Surfinol 465 and Surfinol 104 (both made by Air Products and Chemicals Inc.), and Olfine E1010, Olfine PD001 and Olfine STG (all trade names, made by Nissin Chemical Industry Co., Ltd.). The amount added thereof is preferably 0.1 to 5 wt %, more preferably 0.5 to 2 wt %. By making the amount added be at least 0.1 wt %, sufficient penetrability can be obtained, and by making the amount added be not more than 5 wt %, running of images can easily be prevented from occurring.

From the standpoint of being able to improve the penetrability, the ink composition of the present invention preferably further contains a penetrating agent. By adding a glycol ether as such a penetrating agent, the penetrability can be further increased, and moreover bleeding at interfaces between adjacent color inks in the case of carrying out color printing can be reduced, and hence very sharp images can be obtained.

Examples of glycol ethers include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, and triethylene glycol monobutyl ether. The amount added thereof is preferably 3 to 30 wt %, more preferably 5 to 15 wt %. If the amount added is less than 3 wt %, then a bleeding prevention effect may not be obtained. Moreover, if the amount added exceeds 30 wt %, then running of images will occur, and moreover oil separation will occur and hence a dissolution aid will become necessary for the glycol ether, and discharge will become difficult with an ink jet head.

Furthermore, the ink composition of the present invention may as required have added thereto pH regulators such as triethanolamine and alkali metal hydroxides, hydrotropic agents such as urea and derivatives thereof, water-soluble polymers such as sodium alginate, water-soluble resins, fluorinated surfactants, fungicides, corrosion inhibitors, preservatives, and so on.

An example of a method of preparing the ink composition of the present invention is a method in which the various components are thoroughly mixed together and dissolution is carried out, pressure filtration is carried out using a membrane filter having a pore size of 0.8 μm, and then degassing is carried out using a vacuum pump, thus preparing the ink composition.

The present invention is also able to provide an ink cartridge comprising an ink composition as described above. According to the ink cartridge of the present invention, handling such as transportation of an ink according to which the indoor storability (gas resistance) of formed images can be improved and rapid discoloration/fading of images can be prevented effectively is made easy.

Next, a description will be given of a recording method of the present invention using an ink composition as described above. As the recording method of the present invention, an ink jet recording method in which the ink composition is discharged as droplets from fine holes, and the droplets are attached to a recording medium so as to carry out recording can be particularly preferably used, but it goes without saying that the ink composition can also be used with general writing instruments, recorders, pen plotters, and so on.

As an ink jet recording method, any method that has been publicly known from hitherto can be used, but excellent image recording can be carried out in particular with a method in which the droplets are discharged using vibration of piezoelectric elements (a recording method using an ink jet head that forms ink droplets through mechanical deformation of electrostrictive elements) or a method using thermal energy.

Moreover, a recorded article of the present invention is obtained by recording using an ink composition as described above; with such a recorded article, indoor storability (gas resistance) of images is excellent, and rapid discoloration/fading does not occur.

Following is a more specific description of the present invention, giving examples of the present invention and comparative examples; however, the present invention is not limited whatsoever to these examples.

(First Preferable form of the Present Invention)

EXAMPLES 1 TO 8 AND COMPARATIVE EXAMPLES 1 TO 6

Components were mixed together in the mixing proportions shown in Table 1 and dissolution was carried out, and pressure filtration was carried out using a membrane filter having a pore size of 1 μm, thus preparing ink compositions of Examples 1 to 8 and Comparative Examples 1 to 6.

TABLE 1

| | | Examples | | | | | | | | Comparative Examples | | | | | |
|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 |
| Colorant | C.I. Direct Blue 199 (*1) | 1 | 1.5 | 1 | 1 | 0.5 | 0.5 | 1 | 0.5 | 1 | 1 | 1.5 | 1 | 1 | 1 |
| Solvents etc. | Glycerol | 10 | 5 | 10 | 10 | 3 | 3 | | | 10 | 10 | 5 | 10 | 10 | 10 |
| | Triethylene glycol | 10 | 10 | 10 | 10 | 15 | 15 | 20 | 20 | 5 | 5 | 10 | 10 | 10 | 10 |
| | 2-pyrrolidone | | 1 | 1 | 1 | 0.5 | 0.5 | 1 | 1 | 1 | 1 | 1 | 1 | 1 | 1 |
| | Triethanolamine | 1 | | | | 0.5 | 0.5 | | | 1 | 1 | | | | |
| | Diethylene glycol monobutyl ether | | | 10 | 10 | | | | | | | | 10 | 10 | 10 |
| | Triethylene glycol monobutyl ether | 10 | 10 | | | 12 | 12 | 10 | 10 | 10 | 10 | 10 | | | |
| | Olfine E1010 (*2) | 1 | 1 | | | 0.5 | 0.5 | | | 1 | 1 | 1 | | | |
| | Olfine PD001 (*2) | | | 1 | 1 | | | 1 | 1 | | | | 1 | 1 | 1 |
| | Lithium hydroxide monohydrate | | | | 0.4 | | | | | | | | | 0.4 | 0.4 |
| | Ammonia water (25% aq.) | | | | 2.7 | | | | | | | | | | 2.6 |
| Additives | Sodium benzenesulfonate | | | 3 | | | | | | | | | | | |
| | Disodium benzene-1,3-disulfonate | | | | | 0.1 | | | | | | | | | |
| | Dipotassium benzene-1,3-disulfonate | | | | | | 0.5 | | | | | | | | |
| | Naphthalene-1-sulfonic acid | | | 2 | 2 | | | | | | | | | | |
| | Sodium naphthalene-1-sulfonate | | | | | | | 0.1 | | | | | | | |
| | Disodium naphthalene-1,5-disulfonate | 3 | | | | | | | | | | | | | |
| | Disodium naphthalene-1,6-disulfonate | | | | | | | | 5 | | | | | | |
| | 6-aminonaphthalene-1-sulfonic acid | | | | | | | | | | | | 2 | | |
| | Sodium p-hydroxybenzenesulfonate | | | | | | | | | | | 3 | | | |
| | Disodium 3-aminonaphthalene-1,5-disulfonate | | | | | | | | | | 3 | | | | |
| | Naphthalene-1-carboxylic acid | | | | | | | | | | | | | 2 | |
| | Ethane-1-sulfonic acid | | | | | | | | | | | | | | 2 |
| Others | Proxel XL-2 (*3) | 0.3 | 0.3 | 0.3 | 0.3 | 0.3 | 0.3 | 0.3 | 0.3 | 0.3 | 0.3 | 0.3 | 0.3 | 0.3 | 0.3 |
| | Water | | | | | | Remainder | | | | | | | | |
| Ratio between colorant and aromatic sulfonic acid/sulfonate | | 1:3 | 1:2 | 1:2 | 1:2 | 1:0.2 | 1:1 | 1:0.1 | 1:10 | — | 1:3 | 1:2 | 1:2 | — | — |

(*1) Colorant having absorption wavelengths as shown in FIG. 1 used
(*2) Made by Nissin Chemical Industry Co., Ltd.
(*3) Made by Avecia Ltd.

The amount of each component of each ink composition shown in Table 1 indicates the wt % of that component relative to the total amount of the ink composition; the remainder is water.

Using an EM-930C ink jet printer (made by Seiko Epson Corporation), each of the above ink compositions of Examples 1 to 8 and Comparative Examples 1 to 6 was filled into a cartridge (cyan chamber) specially for this ink jet printer, and printing was carried out onto a recording medium specially for ink jet recording (Premium Glossy Photo Paper, made by Seiko Epson Corporation), and the following evaluations were carried out.

<Evaluation of Ozone Resistance>

Using a cartridge as above, printing was carried out with the duty adjusted such that the OD (optical density) was in a range of 0.9 to 1.1, and the printed article obtained was exposed for a prescribed time (6 or 12 hours) under conditions of 24° C., a relative humidity (RH) of 60%, and an ozone concentration of 10 ppm using an OMS-H (trade name, made by Suga Test Instruments Co., Ltd.) ozone weather meter.

After the exposure, the OD of each printed article was measured using a densitometer (Spectrolino, made by Gretag), the relict optical density (ROD) was determined using the following equation, and evaluation was carried out using the following judgement criteria.

$$ROD(\%) = (D/D_0) \times 100$$

D: OD after exposure test
$D_0$: OD before exposure test
(Measurement conditions: Filter: red, light source: D50, visual field angle: 20°)

[Judgement Criteria]
Evaluation A: ROD at least 90%
Evaluation B: ROD at least 80% but less than 90%
Evaluation C: ROD at least 70% but less than 80%
Evaluation D: ROD 70% or less <Evaluation of Nitrogen Oxide Resistance>

Using a cartridge as above filled with the ink composition of each of Examples 1 to 8 and Comparative Examples 1 to 6, printing was carried out with the duty adjusted such that the OD (optical density) was in a range of 0.9 to 1.1, and the printed article obtained was exposed for a prescribed time (6 or 12 hours) under conditions of 24° C., a relative humidity (RH) of 60%, and a nitrogen dioxide concentration of 10 ppm using an GS-UV (trade name, made by Suga Test Instruments Co., Ltd.) gaseous corrosion tester.

After the exposure, the CIE-L*a*b* coordinates of each printed article were measured using a densitometer (Spectrolino, made by Gretag), the color difference (ΔE) was determined using the following equation, and evaluation was carried out using the following judgement criteria.

$$\Delta E = \{(L^* - L_0^*)^2 + (a^* - a_0^*)^2 + (b^* - b_0^*)^2\}^{1/2}$$

L*, a*, b*: Values of coordinates after exposure test
$L_0^*$, $a_0^*$, $b_0^*$: Values of coordinates before exposure test

[Judgement Criteria]
Evaluation A: ΔE less than 3
Evaluation B: ΔE at least 3 but less than 10
Evaluation C: ΔE at least 10 but less than 20
Evaluation D: ΔE at least 20

<Clogging Resistance>

Each ink composition was filled into an EM-930C ink jet printer (made by Seiko Epson Corporation), printing was carried out continuously for 10 minutes, and once it had been confirmed that ink was being discharged from the nozzles, the printing was stopped. The printer was then left with the head uncapped for two weeks at 40° C. and 25% RH for each of the ink compositions of Examples 1 to 8 and Comparative Examples 1 to 6. After that, a nozzle cleaning operation was carried out, and then printing was carried out again. The clogging resistance of the ink was evaluated through the number of times that the cleaning operation had to be carried out until printing on a par with initially was possible, with no printing defects such blurring or omission.

[Judgement Criteria]
Evaluation A: Printing on a par with initially obtained after carrying out the cleaning operation 1 to 5 times
Evaluation B: Printing on a par with initially obtained after carrying out the cleaning operation 6 to 10 times
Evaluation C: Printing on a par with initially obtained after carrying out the cleaning operation 11 to 15 times
Evaluation D: Printing on a par with initially not possible even after carrying out the cleaning operation at least 16 times The evaluation results obtained are shown in Table 2.

TABLE 2

| | | Ozone resistance | | NO₂ resistance | | Clogging resistance |
| --- | --- | --- | --- | --- | --- | --- |
| | | 6 hours | 12 hours | 6 hours | 12 hours | |
| Examples | 1 | A | A | A | A | A |
| | 2 | A | B | A | A | B |
| | 3 | A | B | A | A | A |
| | 4 | A | C | A | A | A |
| | 5 | A | B | A | A | A |
| | 6 | A | B | A | A | A |
| | 7 | A | C | A | A | A |
| | 8 | A | A | A | A | B |
| Comparative Examples | 1 | B | D | A | A | A |
| | 2 | A | A | D | D | A |
| | 3 | A | B | D | D | B |
| | 4 | A | B | D | D | A |
| | 5 | B | D | A | A | A |
| | 6 | B | D | A | A | B |

(Secomd Preferable form of the Present Invention)

EXAMPLES 9 TO 13 AND COMPARATIVE EXAMPLES 7 TO 9

Components were mixed together in the mixing proportions shown in Table 3 and dissolution was carried out, and pressure filtration was carried out using a membrane filter having a pore size of 1 μm, thus preparing ink compositions of Examples 9 to 13 and Comparative Examples 7 to 9.

TABLE 3

| | | \multicolumn{5}{c|}{Examples} | \multicolumn{3}{c|}{Comparative Examples} |
|---|---|---|---|---|---|---|---|---|---|
| | | 9 | 10 | 11 | 12 | 13 | 7 | 8 | 9 |
| Colorant | C.I. Direct Blue 86 (*4) | 1 | 1 | 1.5 | 1.5 | 0.5 | 1 | 1 | 1 |
| Solvents etc. | Glycerol | 5 | 5 | 5 | 10 | 10 | 5 | 5 | 5 |
| | Triethylene glycol | 5 | 10 | 10 | 3 | 3 | 5 | 5 | 10 |
| | 2-pyrrolidone | | | 1 | 1 | 2 | 2 | | 1 |
| | Triethanolamine | 1 | | | 0.5 | 0.5 | 1 | 1 | |
| | Diethylene glycol monobutyl ether | | | | 8 | 8 | | | |
| | Triethylene glycol monobutyl ether | 10 | 10 | 10 | | | 10 | 10 | 10 |
| | Olfine E1010 (*5) | | | 1 | 1 | | | | 1 |
| | Olfine PD001 (*5) | 1 | | | 1 | 1 | 1 | 1 | |
| | Potassium hydroxide | | | | 1 | | | | |
| Additives | Benzenesulfonic acid | | | | 3 | | | | |
| | Sodium naphthalene-2-sulfonate | | 3 | | | | | | |
| | Disodium naphthalene-2,6-disulfonate | 4 | | | | | | | |
| | Disodium naphthalene-2,7-disulfonate | | | 5 | | | | | |
| | Trisodium naphthalene-1,3,6-trisulfonate | | | | | 10 | | | |
| | Disodium 4,5-dihydroxy naphthalene-2,6-disulfonate | | | | | | | 4 | |
| | Sodium 7-amino-4-hydroxynaphthalene-2-sulfonate | | | | | | | | 3 |
| Others | Proxel XL-2 (*6) | 0.3 | 0.3 | 0.3 | 0.3 | 0.3 | 0.3 | 0.3 | 0.3 |
| | Water | \multicolumn{8}{c|}{Remainder} |
| Ratio between colorant and aromatic sulfonic acid/sulfonate | | 1:4 | 1:3 | 1:2 | 1:3.3 | 1:10 | — | 1:1.4 | 1:3 |

Figure 2:
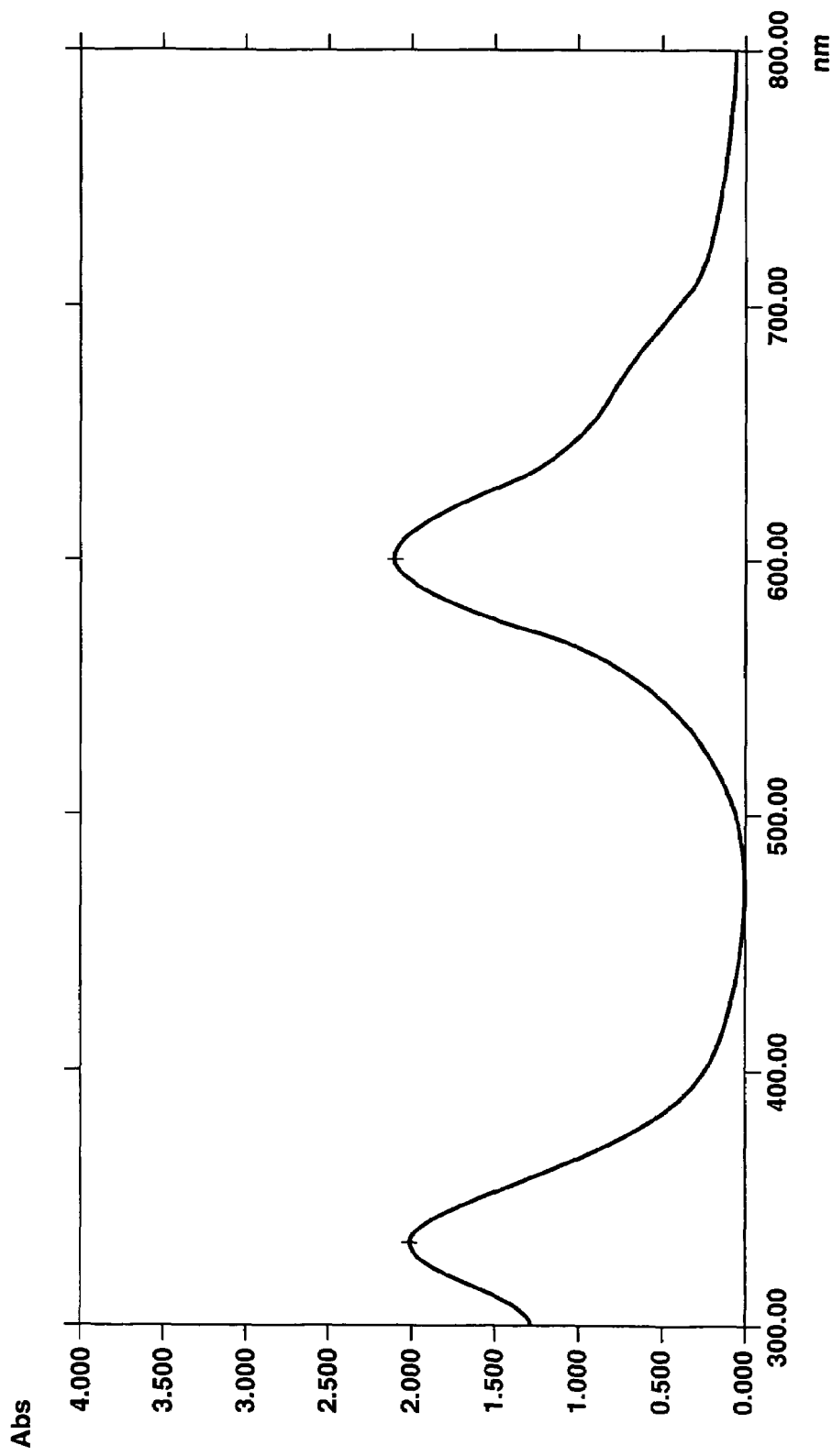
FIG. 2 is a graph showing the spectral characteristics (absorption wavelengths) of a dye (C.I. Direct Blue 199) (*1) contained in an ink composition of a second preferable form according to the present invention.

(*4) Colorant having absorption wavelengths as shown in FIG. 2 used
(*5) Made by Nissin Chemical Industry Co., Ltd.
(*6) Made by Avecia Ltd.

The amount of each component of each ink composition shown in Table 3 indicates the wt % of that component relative to the total amount of the ink composition; the remainder is water.

Printing was carried out for each of the ink compositions of Examples 9 to 13 and Comparative Examples 7 to 9 using the same method as for the first preferable form, and the following evaluations were carried out.

<Ozone Resistance Test>

Exposure to ozone was carried out using the same method as for the first preferable form, except that the ozone concentration was made to be 2 ppm.

After the exposure, the OD of each printed article was measured using a densitometer (Spectrolino, made by Gretag), the relict optical density (ROD) was determined, and evaluation was carried out using the following judgement criteria.

[Judgement Criteria]
Evaluation A: ROD at least 90%
Evaluation B: ROD at least 80% but less than 90%
Evaluation C: ROD at least 70% but less than 80%
Evaluation D: ROD 70% or less <Nitrogen Oxide Resistance Test>

Exposure to nitrogen dioxide was carried out for each of the ink compositions of Examples 9 to 13 and Comparative Examples 7 to 9 using the same method as for the first preferable form.

After the exposure, the CIE-L*a*b* coordinates of each printed article were measured using a densitometer (Spectrolino made by Gretag), the color difference (ΔE) was determined, and evaluation was carried out using the following judgement criteria.

[Judgement Criteria]
Evaluation A: ΔE less than 3
Evaluation B: ΔE at least 3 but less than 10
Evaluation C: ΔE at least 10 but less than 20
Evaluation D: ΔE at least 20

<Clogging Resistance>

A clogging resistance test was carried out for each of the ink compositions of Examples 9 to 13 and Comparative Examples 7 to 9 using the same method as for the first preferable form, and the recoverability was evaluated using the following judgement criteria.

[Judgement Criteria]
Evaluation A: Printing on a par with initially obtained after carrying out the cleaning operation 1 to 5 times
Evaluation B: Printing on a par with initially obtained after carrying out the cleaning operation 6 to 10 times
Evaluation C: Printing on a par with initially obtained after carrying out the cleaning operation 11 to 15 times
Evaluation D: Printing on a par with initially not possible even after carrying out the cleaning operation at least 16 times The evaluation results obtained are shown in Table 4.

TABLE 4

| | | \multicolumn{2}{c|}{Ozone resistance} | \multicolumn{2}{c|}{NO₂ resistance} | Clogging |
|---|---|---|---|---|---|---|
| | | 6 hours | 12 hours | 6 hours | 12 hours | resistance |
| Examples | 9 | A | B | A | A | B |
| | 10 | A | C | A | A | A |
| | 11 | B | C | A | A | A |
| | 12 | A | B | A | A | B |
| | 13 | A | A | A | A | C |
| Comparative Examples | 7 | C | D | A | A | A |
| | 8 | A | B | D | D | B |
| | 9 | A | C | D | D | A |

The present invention has industrial applicability as an ink composition using a metal phthalocyanine type cyan dye, according to which the indoor storability (gas resistance) of formed images can be improved, and rapid discoloration/fading of images can be prevented effectively, and an ink jet recording method and a recorded article using this ink composition.

According to the ink composition of the present invention, excellent effects are produced in that the indoor storability (gas resistance) of obtained images can be improved, and rapid discoloration/fading of an images can be prevented effectively.

We claim:

1. An ink composition, characterized by containing water, metal phthalocyanine cyan dye, and aromatic compound having a sulfo group represented by undermentioned general formula (1) and/or (2):

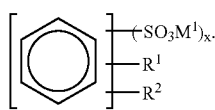

wherein $M^1$ represents a lithium counter ion forming a salt, X represents an integer from 1 to 3, and $R^1$ and $R^2$ each represents a hydrogen atom, an alkyl group having 1 to 6 carbon atoms or an alkoxy group having 1 to 6 carbon atoms, and $R^1$ and $R^2$ may be the same or different;

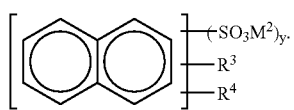

wherein $M^2$ represents a lithium counter ion forming a salt, Y represents an integer from 1 to 4, and $R^3$ and $R^4$ each represents a hydrogen atom, an alkyl group having 1 to 6 carbon atoms or an alkoxy group having 1 to 6 carbon atoms, and $R^3$ and $R^4$ may be the same or different.

2. The ink composition according to claim 1, wherein the metal phthalocyanine cyan dye is a copper phthalocyanine dye represented by undermentioned formula (3):

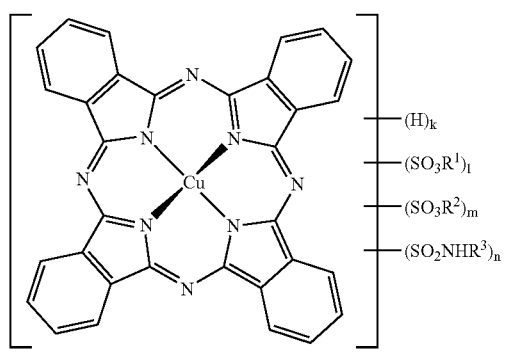

wherein $R^1$ represents H, an alkali metal or —$NH_4$, $R^2$ represents an alkali metal or —$NH_4$, and $R^3$ represents H, an optionally substituted alkyl group or an optionally substituted aryl group; moreover, k, l and n each represents a natural number from 0 to 3, and m represents a natural number from 1 to 4, and k+l+m+n=4.

3. The ink composition according to claim 2, wherein the copper phthalocyanine dye is C.I. Direct Blue 86, 87 and/or 199.

4. The ink composition according to claim 1, wherein the metal phthalocyanine cyan dye is a dye for which the absorption spectrum in the visible region (400 to 800 nm) has a maximum absorption peak at a wavelength in a range of 590 to 650 nm.

5. The ink composition according to claim 1, wherein the metal phthalocyanine cyan dye is a dye for which the absorption spectrum in the visible region (400 to 800 nm) has a maximum absorption peak at a wavelength in a range of 590 to 615 nm.

6. The ink composition according to claim 1, wherein the metal phthalocyanine cyan dye is a dye for which the absorption spectrum in the visible region (400 to 800 nm) has a maximum absorption peak at a wavelength in a range of 590 to 605 nm.

7. The ink composition according to claim 1, wherein the aromatic compound having a sulfo group has two sulfo groups.

8. The ink composition according to claim 7, wherein the aromatic compound having a sulfo group and/or salt thereof is at least one selected from the group consisting of benzene-1,3-disulfonic acid, naphthalene-1,5-disulfonic acid, naphthalene-1,6-disulfonic acid, naphthalene-2,6-disulfonic acid, naphthalene-2,7-disulfonic acid, and naphthalene-1,3,6-trisulfonic acid.

9. The ink composition according to claim 1, containing 0.1 to 10 wt % of the aromatic compound having a sulfo group relative to the total amount of the ink composition.

10. The ink composition according to claim 1, wherein the content ratio between the metal phthalocyanine type cyan dye and the aromatic compound having a sulfo group is in a range of 1:0.1 to 1:10.

11. The ink composition according to claim 1, further containing a nonionic surfactant.

12. The ink composition according to claim 11, wherein the nonionic surfactant is an acetylene glycol surfactant.

13. The ink composition according to claim 11, containing 0.1 to 5 wt % of the nonionic surfactant relative to the total amount of the ink composition.

14. The ink composition according to claim 1, further containing a penetrating agent.

15. The ink composition according to claim 14, wherein the penetrating agent is a glycol ether.

16. The ink composition according to claim 1, wherein the ink composition has a pH at 20° C. in a range of 8.0 to 10.5.

17. An ink jet recording method comprising providing the ink composition according to claim 1 and ejecting droplets of the ink composition onto a recording medium.

18. The recording method according to claim 17, wherein the droplets of the ink composition are ejected from an ink jet head that forms ink droplets through mechanical deformation of electrostrictive elements.

19. An ink cartridge, characterized by comprising the ink composition according claim 1.

20. An ink jet recording method, comprising providing the ink composition according to claim 2, and carrying out recording by discharging droplets of the ink composition and attaching the droplets to a recording medium.

21. A recorded article produced, by depositing the ink composition according to claim 1 onto a recording medium.

* * * * *